United States Patent [19]

Dravnieks et al.

[11] 4,100,938
[45] Jul. 18, 1978

[54] FLOW CONTROL UNIT FOR AIR DISTRIBUTION SYSTEM

[75] Inventors: Konstantins Dravnieks, Madison; Rueben Zahler, Verona; Gordon C. Sylvester, Madison, all of Wis.

[73] Assignee: Wehr Corporation, Milwaukee, Wis.

[21] Appl. No.: 751,439

[22] Filed: Dec. 16, 1976

[51] Int. Cl.² .............................................. F16K 47/14
[52] U.S. Cl. ................................. 137/625.31; 251/118
[58] Field of Search ....................... 137/625.31, 625.28, 137/625.3; 251/305, 127, 118

[56] References Cited

U.S. PATENT DOCUMENTS

| 3,049,146 | 8/1962 | Hayes | 137/625.28 X |
| 3,817,099 | 6/1974 | Bubniak et al. | 138/46 X |

FOREIGN PATENT DOCUMENTS

| 839,419 | 1/1939 | France | 251/305 |

*Primary Examiner*—Arnold Rosenthal

[57] ABSTRACT

The flow control unit includes a shell or housing defining a flow passage and a damper assembly disposed in the housing for controlling the volume of air flowing through the flow passage. The damper assembly includes a pivotally mounted damper blade which is partially surrounded by a pair of perforated members, one located upstream and the other located downstream of the damper blade pivot axis. Each of the perforated members have an arcuate cross-sectional shape and is disposed in close proximity to the travel path of one of the outer edges of the damper blade. The perforate members preferably have an open edge spaced from a longitudinal plane extending through the damper blade pivot axis. During initial damper blade travel from the closed position toward the open position, substantially all of the air flows through the perforations of the perforate members. During subsequent damper blade travel as the damper blade approaches the fully open position, an open flow passage exists between the damper blade and the open edges of the perforate members. The open edges of the perforate members preferably extend at an angle to the above plane so that the flow area of the open flow passage gradually increases as the damper blade approaches the fully open position.

8 Claims, 4 Drawing Figures

FLOW CONTROL UNIT FOR AIR DISTRIBUTION SYSTEM

BACKGROUND OF THE INVENTION

This invention relates to control units for air distribution systems and, more particularly, to damper arrangements for use in terminal control units for air distribution systems.

It is well known that air flow terminal units for air distribution systems are subject to self-generated noise which may reach excessive levels, particularly when air is being delivered at relatively high velocities and pressures. Generally, it is necessary to provide some sort of noise attenuation such as by lining the interior of the unit with a sound-absorbing material. Conventional porous materials used for this purpose are capable of absorbing sound waves having lengths up to four times the thickness of the material. However, excessive thickness of the material are required to attenuate low frequency sound which has relatively long waves. For example, some low frequency sound waves can be as long as 48 inches and require a 12 inch layer of sound-absorbing material. The size of the housing required to accommodate a material of this thickness obviates this approach as a practical solution for many installations.

Prior art constructions have employed perforated plates, located upstream and/or downstream of the control damper, to break the mainstream into a plurality of smaller streams having a higher frequency sound which can be more easily attenuated. While alleviating the problem in some cases, such prior art constructions are not without disadvantages. The perforated plates can create excessive pressure drops and/or the divided air streams can subsequently merge back together before they have passed through the damper or the air outlet.

Exemplary prior art constructions of control arrangements which employ perforated members to minimize noise generation are disclosed in U.S. Pat. Nos. 3,911,958 (Logsdon), 3,750,839 (McNabney) and 2,807,329 (Caldwell).

SUMMARY OF THE INVENTION

One of the principal objects of the invention is to provide an improved control unit for an air distribution system which can provide variable volume distribution without requiring a large amount of sound absorbing material to attenuate noise.

Another principal object of the invention is to provide a control unit for an air distribution system having a damper assembly which is arranged to minimize noise generation and yet does not cause excessive pressure drops.

Further objects, aspects and advantages of the invention will become apparent to those skilled in the art upon reviewing the following detailed description, the drawing and the appended claims.

The control unit provided by the invention comprises a housing having an inlet, an outlet and a flow passage extending between the outlet and the inlet and a flow control assembly disposed in the housing for controlling the volume of air flowing through the flow passage. The flow control assembly includes a damper mounted for pivotal movement about an axis extending transversely of the flow passage between an open position and a closed position and further includes first and second transversely extending perforate members, each having a plurality of orifices and being disposed in generally surrounding relationship with and in close proximity to the arcuate travel path of the opposed outer edges of the damper.

The first and second perforate members include a portion respectively disposed upstream and downstream of the damper pivot axis and are arranged so that, during initial portion of the damper travel from the closed position to the open position, the damper cooperates with the perforate members to cause substantially all the air flowing from the housing inlet to the housing outlet to pass through the perforations of the perforate members and be divided into a plurality of small streams having high frequency sound. The perforate members also are arranged to provide transversely extending openings therebetween so that, during a subsequent portion of the damper travel as the damper approaches the fully open position, an open flow passage exists between the damper and the perforate members, thereby minimizing the static pressure when the damper is fully open without causing the generation of low frequency sound.

In a preferred embodiment, the damper is disposed substantially parallel to the direction of flow through the flow passage when in the fully open position and the perforate members terminate in a transversely extending open edge including at least a portion which is spaced from a longitudinal plane extending through the damper pivot axis parallel to the direction of flow so that an open flow passage exists between the open edges and the damper when it is in the fully open position. These open edges preferably extend at an angle to the above longitudinal plane so that the flow area of the open flow passage gradually increases as the damper approaches the fully open position, resulting in a gradual decrease in the static pressure required to force air through the flow control assembly.

DESCRIPTION OF THE PREFERRED EMBODIMENTS

The control unit of the invention will be described in connection with an air distribution system wherein cool air is delivered to the interior of a building. However, it can be appreciated that it can be used for other applications, such as in systems delivering heated air.

Figure 1:
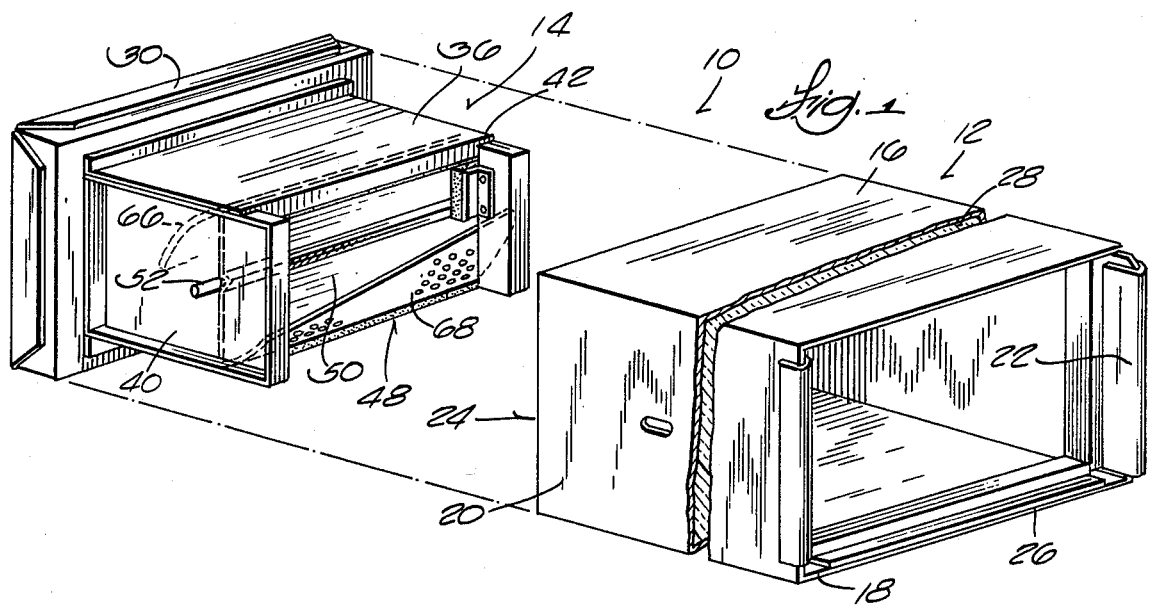
FIG. 1 is an exploded, perspective view, partially fragmentary, of a control unit embodying the invention.

Referring to FIG. 1, the control unit 10 includes a main shell or housing 12 which carries an air flow control assembly 14. The housing 12 has top and bottom walls 16 and 18, side walls 20 and 22, and an open inlet end 24 in which the flow control assembly 14 is received and an open outlet end 26 which is connected, in the usual manner, to an air diffuser (not shown) or the like through which the air is delivered into a room or other area being serviced. The interior of the housing 12 is lined with a relatively thin layer of a porous sound-absorbing material 28, such as neoprene-backed, flexible glass fiber, for acoustical purposes. As a guide, this material can be approximately ½ inch thick and has a density of approximately 1.5 lb. per cubic foot.

Figures 2, 4:
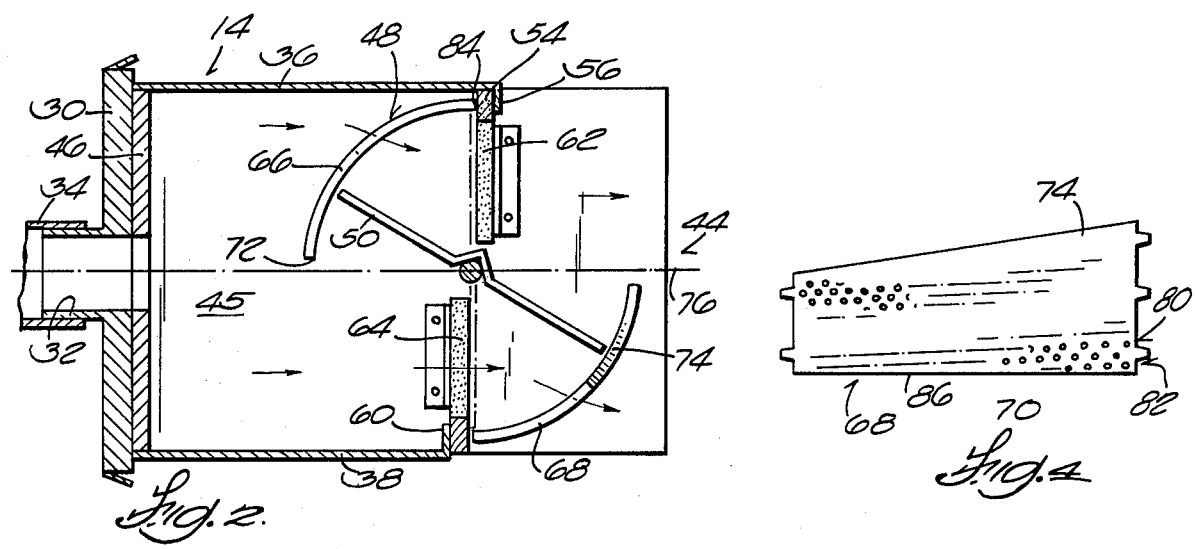
FIG. 2 is a fragmentary, longitudinal sectional view of the control unit illustrated in FIG. 1.
FIG. 4 is a reduced plan view of one of the perforated members prior to being formed into an arcuate shape.

The flow control assembly 14 includes an end plate 30 which, after installation of the flow control assembly inside the housing 12, covers the inlet end 24 of the housing and carries a collar 32 for attachment to a flexible duct 34 of the air distributing system (FIG. 2). The flow control assembly 14 also includes top and bottom walls 36 and 38, side walls 40 and 42 and an open outlet end 44. These walls define an open plenum 45. Air entering the plenum 45 through the collar 32 is discharged therefrom into the interior of the housing 12 through the flow control assembly outlet 44 and thereafter flows out through the housing outlet 26. The portion of the inner surface of the end plate 30 located inside the plenum 35 is covered with a layer of sound-absorbing material 46 for acoustical purposes.

The volume of air discharged into the housing 12 is controlled by a damper assembly 48 located near the outlet 44 of the flow control assembly 14. More specifically, the damper assembly 48 includes an imperforate damper blade 50 carried on a shaft 52 which extends between and is suitably journaled in the side walls 40 and 42 for pivotal movement about the pivot axis 53 provided by the shaft 52. The opposite ends of the damper blade 50 are spaced a small distance from the respective side walls 40 and 42 so as to provide free pivotal movement of the damper blade between a closed position (shown by dashed lines in FIG. 2) to shut off flow through the outlet 44 and a fully open position (not shown) where the damper blade is substantially parallel to the direction of flow from inlet collar 32 to the outlet 44 of the flow control assembly 14.

When the damper blade 50 is in the closed position, the peripheral edge portions thereof are seated against a series of damper gaskets, including a laterally extending top gasket 54 mounted on a flange 56 depending from the top 36, a laterally extending bottom gasket 58 mounted on a flange 60 extending upwardly from the bottom 38, and a pair of vertically extending end gaskets 62 and 64 mounted on each of the side walls 40 and 42.

Partially surrounding the damper blade 50 is a diffuser assembly including a pair of perforate members 66 and 68, each having an arcuate cross section. One of the perforated members 66 is located upstream of the damper blade pivot axis 53 and the other perforated member 68 is located downstream of the damper blade pivot axis 53. In order to reduce the static pressure losses when the damper blade 50 is in or close to the fully open position, the perforate members 66 and 68 preferably extend through an arc of less than 90° as will be explained in more detail below.

Each of the perforated members 66 and 68 include a plurality of orifices 70. When the damper blade 50 is located at a position intermediate the closed and fully open positions to meter the volume of air being delivered through the outlet 26, such as in the solid line position shown in FIG. 2, substantially all of the main air stream flows through the orifices 70 in each of the perforated members 66 and 68 and is divided into a plurality of smaller streams. These small air streams have higher frequency sound and, hence, shorter wave lengths which can be attenuated by the sound-absorbing material 28 lining the housing 12. The inner curvate surfaces of the perforate members preferably are disposed in parallel relationship to the longitudinal edges of the damper blade 50 and are spaced therefrom at a sufficient clearance to permit free pivotal movement of the damper blade without allowing an excessive flow of air around the edges of the damper blade with the resultant generation of long wave frequency sound.

The perforate members 66 and 68 are arranged so that there is an open flow passage for the air when the damper blade 50 is in the fully open position. More specifically, the open or lower edge 72 of the upstream perforate member 66 and the open or upper edge 74 of the downstream perforate member 68 terminates short of the arcuate travel path of the outer edges of the damper blade 50. That is, these edges are circumferentially spaced from a longitudinal plane (designated by reference numeral 76 in FIG. 2) extending through the damper blade pivot axis 53 parallel to the direction of flow. Thus, when the damper blade 50 is in the fully open position, an open flow passage exists between the open edges of the perforate members and the outer edges of the damper blade through which air can flow from the plenum 45 to the outlet 44 without passing through the orifices 70 of the perforate members. This open flow passage minimizes the static pressure loss when the damper blade 50 is fully open to provide maximum volume flow, but does not cause the generation of low frequency sound because of the low pressure drop which exists when the damper blade is in a fully open position.

Figure 3:
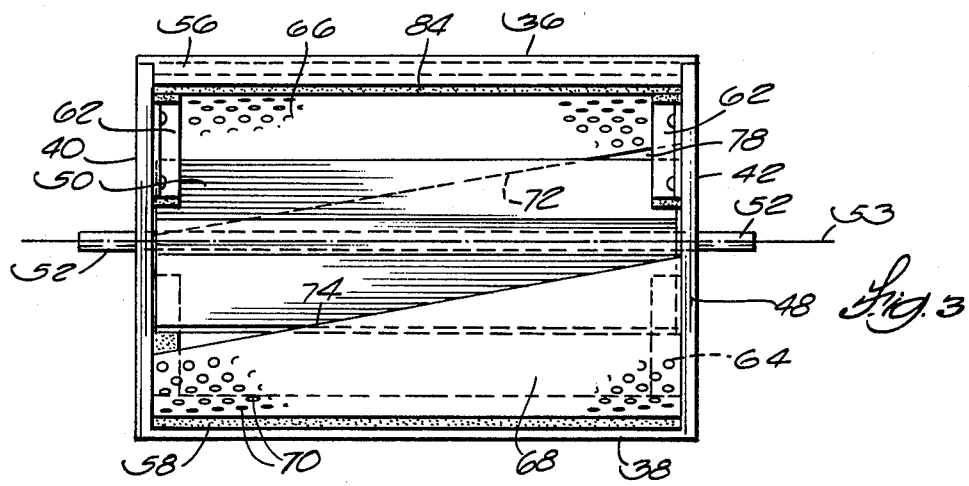
FIG. 3 is an elevation view of the outlet end of the air flow control assembly illustrated in FIG. 2.

The open edges of the perforate members 66 and 68 preferably are arranged so they are not parallel to the damper blade 50 when it is in the fully open position. More specifically, the lower edge 72 of the upstream perforate member 66 extends upwardly from the lowermost end (the left end as viewed in FIG. 3) at an angle (e.g., 5° to 10°) to the longitudinal plane 76 and the upper edge 74 of the downstream perforate member 68 extends downwardly from an uppermost end (the right end as viewed in FIG. 3) at an angle to the longitudinal plane 76. These edges preferably are generally parallel to each other as shown. Thus, once the damper blade 50 has been moved to a position where an open flow passage (designated by reference numerals 78 in FIG. 3) exists between the damper blade 50 and the edges 72 and 74 of the perforate member 68, the flow area of this passage gradually increases as the damper blade subsequently moves toward the fully open position. This results in a gradual decrease in the static pressure required to force the air through the damper assembly 48.

In the specific construction illustrated, the opening defined by the open edges of the perforate members 66 and 68 has a rhomboid shape with respect to the direction of flow. It should be understood that the open edges of the perforate members can be arranged to provide an opening having a wide variety of shapes so long as an open flow passage exists as the damper blade approaches the fully open position.

As shown in FIG. 4, the orifices 70 in the perforate plates preferably are arranged in a plurality of rows 80 and 82 which are parallel to each other but not parallel to the straight edge of the perforate member, i.e., top edge 84 of the upstream perforate member 66 and the lower edge 86 of the downstream perforate member 68. Also, the orifices 70 in adjacent rows 80 and 82 preferably are staggered. As a guide, the orifices 70 can be sized to provide about 22% open area in each of the perforate members, e.g., 3/32 inch diameter holes on 3/16 inch staggered centers.

In addition to performing the sound attenuation function described above, the perforate members reduce the amount of torque required to maintain a centrally pivoted damper blade in a partially closed position. That is, the aerodynamic characteristics of a centrally pivoted damper blade are such that air flowing therepast normally causes the blade to assume a partially closed position once it has been moved from a position parallel to the direction of flow. In order to overcome this torque, the means for adjusting the damper blade position must be relatively large. By partially surrounding or encasing the damper blade, the perforate members alter the aerodynamic characteristics so that this torque is reduced substantially and smaller blade positioning means can be used.

While a centrally pivoted damper blade has been illustrated and described, and is preferred because of the ease of manufacture, off-center pivoted damper blades can be used. In that case, the curvate inner surfaces of the perforate members are arranged to be substantially parallel to the travel path of the respective edge of the damper blade so as to avoid the creation of large openings between the damper blade and the perforate members which can result in the generation of long wave frequency sound.

Although a preferred embodiment of the invention has been illustrated and described in detail, it should be understood that various alterations and modifications can be made thereto without departing from the spirit of the invention or the scope of the appended claims.

We claim:

1. A control unit for an air distribution system comprising
    a housing having an inlet, an outlet and a flow passage extending between said inlet and said outlet; and
    a flow control assembly disposed in said housing for controlling the volume of air flowing through said flow passage including
    a damper mounted for pivotal movement, about an axis extending transversely for said flow passage, between an open position and a closed position to shut off flow through said flow passage, said damper having opposed transversely extending outer edges,
    first and second transversely extending perforate members including a plurality of relatively small orifices and disposed in generally surrounding relationship and in close proximity to the arcuate travel path of said damper outer edges, said first and second perforate members each having a transversely extending open edge and being arranged such that, during an initial portion of damper travel from the closed position towards the open position, said damper cooperates with said perforate members to cause substantially all of the air flowing from said inlet to said outlet to pass through said orifices and such that, during a subsequent portion of damper travel toward the fully open position, an open flow passage exists between said damper and said open edges.

2. A control unit according to claim 1 wherein
    said damper is disposed substantially parallel to the direction of flow through said flow passage when in a fully open position, and
    each of said first and second perforate members include a portion which is respectively disposed on the upstream side and the downstream side of the damper pivot axis and which terminates in a transversely extending open edge including at least a portion which is circumferentially spaced from a longitudinally plane extending through said damper pivot axis parallel to the direction of flow.

3. A control unit according to claim 2 wherein each of said open edges extend at an angle to said plane so that the area of said open flow passage gradually increases as said damper approaches the fully open position.

4. A control unit according to claim 3 wherein
    said damper is centrally pivotally mounted, and
    said open edges of said perforated members are generally diametrically opposed with respect to the arcuate travel path of said damper and are generally parallel to each other.

5. A control unit according to claim 2 wherein, each of said perforate members, in cross section, extend through an arc of less than 90° and include a transversely extending edge opposite said open edge disposed adjacent respective of said damper outer edges when said damper is in the closed position.

6. A control unit for an air distribution system comprising
    a housing having an inlet, an outlet and a flow passage extending between said inlet and said outlet; and
    a flow control assembly disposed in said housing for controlling the volume of air flowing through said flow passage including
    a damper centrally mounted for pivotal movement about an axis extending transversely of said flow passage between a fully open position substantially parallel to the direction of flow to said flow passage and a closed position to shut off flow, said damper blade having opposed transversely extending outer edges,
    a first transversely extending, arcuate perforate member including a plurality of relatively small orifices disposed upstream of said damper blade pivot axis adjacent the arcuate travel path of one of said damper blade outer edges,
    a second transversely extending, arcuate perforate member including a plurality of relatively small orifices disposed downstream of said damper blade pivot axis adjacent the arcuate travel path of the other of said damper blade outer edges,
    said damper blade cooperating with said perforate members to cause substantially all of the air flowing from said inlet to said outlet to pass through said orifices during an initial portion of the damper blade travel from the closed position toward the open position, and
    each of said perforate members having a transversely extending open edge circumferentially spaced from a longitudinal plane extending through said damper blade pivot axis parallel to the direction of flow such that an open flow passage is defined between said open edges and said damper blade when said damper blade is in the fully open position.

7. A control unit according to claim 6 wherein each of said open edges extend at an angle to said plane so that the area of said open flow passage gradually increases as said damper blade approaches the fully open position.

8. A control unit according to claim 7 wherein said open edges of said perforate members are generally diametrically opposed with respect to the arcuate travel path of said damper blade and are generally parallel to each other.

* * * * *